(12) United States Patent
Bhattacharya et al.

(10) Patent No.: US 7,541,057 B2
(45) Date of Patent: Jun. 2, 2009

(54) METHOD FOR PREPARING MULTIPURPOSE READY-TO-EAT HIGH PROTEIN SOY GRANULES

(75) Inventors: Suvendu Bhattacharya, Mysore (IN); Thotadamoole Ramesh, Mysore (IN); Rangasamy Baby Latha, Mysore (IN); Appu Rao Gopala Rao Appu Rao, Mysore (IN); Vishweshwariah Prakash, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 230 days.

(21) Appl. No.: 10/397,046

(22) Filed: Mar. 25, 2003

(65) Prior Publication Data

US 2004/0191397 A1 Sep. 30, 2004

(51) Int. Cl.
*A23L 1/20* (2006.01)
(52) U.S. Cl. .................. 426/634; 426/456; 426/459
(58) Field of Classification Search .......... 426/456, 426/459, 634
See application file for complete search history.

(56) References Cited

U.S. PATENT DOCUMENTS 3,911,157 A 10/1975 Bates et al.
4,103,034 A * 7/1978 Ronai et al. ............. 426/250
4,369,195 A 1/1983 Nelson et al.
5,626,899 A 5/1997 Payne et al.

FOREIGN PATENT DOCUMENTS

EP 0 385 266 A2 9/1990
EP 0 517 458 A1 12/1992
GB 2 108 511 A 5/1983

OTHER PUBLICATIONS

Particle Size U.S. Sieve Series and Equivalents. Date unknown. http://www.azom.com/details.asp?ArticleID-1417.*

* cited by examiner

*Primary Examiner*—Anthony Weier
(74) *Attorney, Agent, or Firm*—Arent Fox LLP

(57) ABSTRACT

A method for preparing multipurpose ready-to-use, high-protein soy granules from texturized vegetable protein having protein content in the range of 45-52% and moisture content in the range of 3 to 8% said process comprising the steps of partial hydration of the texturized vegetable protein pieces/chunks for a period of 15 min to 2 hour such that the moisture content is between 15-25%, equilibration of partially hydrated soy pieces/chunks for a period between 15 minutes and 4 hours, disintegration of the equilibrated soy chunks/pieces by using a shearing machine to obtain a granule size of 1 to 6 mm, and drying the disintegrated granules at a temperature between 40-80° C. for a period between 15 min to 3 hours by using a tray dryer to obtain the multipurpose ready-to-use, high-protein soy granules.

19 Claims, No Drawings

METHOD FOR PREPARING MULTIPURPOSE READY-TO-EAT HIGH PROTEIN SOY GRANULES

FIELD OF THE INVENTION

The present invention relates to a multipurpose ready-to-use high-protein soy granules obtained from texturised vegetable protein and a process for preparing the same.

BACKGROUND AND PRIOR ART DESCRIPTION

The demand for high protein foods is a well-known fact in which several protein sources are used of which major contribution arises from plant sources. The technological advances concerning the creation of a new texture particularly using soybean protein have lead to the development of texturised vegetable protein (TVP) or texturised plant protein (TPP) or meat analogue or soya chunk which basically formed the man made food popularly known as fabricated foods or engineering foods. The use of an extruder under appropriate pressure-shear-temperatures combination yields a product that is fibrous in nature, filamentary in structure, and toughness and chewy texture of meat. This whole process is called thermoplastic extrusion. The advantages of this technology lie in low product cost mainly because the raw material to be used is defatted soy flour that is low in cost. In addition, the abundance of defatted soy flour in concert with technological advantages of extrusion cooking have made this type of product popular among several types of people including those who can hardly afford the high cost of animal protein.

The thermoplastic extrusion process involves the preparation of defatted soy flour-water mixture along with other ingredients followed by feeding the mixture into a cooking extruder wherein it is subjected to heat, shear and pressure. When this cooked viscoelastic mass comes out of a restriction, conventionally known as die, the fibrous expanded structure is formed which solidifies to hard texture on cooling or drying. On rehydration and cooking, the fibrous TVP can provide a texture/bite and a mouth feel comparable to cooked meat. It may be mentioned here that the process of producing TVP and similar products are covered under several patents that are discussed in the subsequent sections.

References may be made to an U.S. Pat. No. 3,911,157 (1975) in which claims have been on a process for preparing texturised vegetable protein from non-textured vegetable materials. The process comprises forming a dough from a source of vegetable protein and water; roll milling the dough to a sheet thickness of 18 mils or less to effect cellular disruption and expose coagulable protein molecules; and cooking the sheeted protein at from 180 to 300° F. in the presence of a non-drying atmosphere of moist steam. The texturized protein is especially adapted to use as an extender for comminuted meat items.

References may be made to a British patent GB2108511 (1983) in which a process for low-cost texturised vegetable protein has been described. A textured protein product having a protein content of up to 80% is produced by mixing soy meal (grits, flakes or flour) with water containing a protein insolubilizing agent to prepare a homogeneous mass; forming from said mass discrete pieces of a desired configuration under temperature and pressure conditions which retain the proteins in the undenatured state and retain the protein in carbohydrate molecules thereof substantially in the original matrix relationship of the starting material; and cooking the pieces in water in order (1) to denature the proteins in situ whereby contiguous protein molecules interlock to form a three dimensional network structure throughout each of the pieces, and (2) to leach out soluble carbohydrates from within the protein structure.

Reference may be made to U.S. Pat. No. 4,369,195 (1983) in which extrusion texturization of full-fat soybean and products thereof have been described. A textured soybean product is produced from full-fat soybean by hydrating whole soybean by treatment with a dilute alkaline solution; mixing the hydrated soybean with full-fat soy flour and equilibrating the moisture content thereof; and passing the mixture through an extrusion cooker. The textured product has excellent flavor, color, and appearance, and can be formulated into an all-vegetable ground meat analogue or it can be used as an extender in blends with ground meat.

The drawbacks of TVP are that they are not in the ready-to-eat form as it is mandatory to cook the same prior to consumption. Sometimes, even the hydrated TVPs offer a too hard or chewy texture that is undesirable from the point of consumer acceptability.

References may be made to a European patent EP0517458 (1992) wherein claim has been made for a process for the production of a protein granule suitable for use as a meat extender using a vegetable protein isolate as the raw material. The isolate is hydrated to a ratio of 2 to 3.5 parts of water to 1 part of isolate, wherein the water is at a temperature of at least 50° C. The hydrated isolate is then blended under conditions of shear for a period of time sufficient to form a hydrated protein granule. The formed granules are highly suitable as an extender for ground meats or as an ingredient in meat analogues. The raw materials used here are different from that of the present invention, and an isolate is too costly. Further, the process of preparation is entirely different from the present one.

References may be made to U.S. Pat. No. 5,626,899 (1997) wherein a process for making vegetable-based meat extenders has been claimed. A vegetable protein crumble for use as a meat extender to replace portions of lean and/or fat is made from one part soy protein isolate hydrated in about 3.5-5.0 parts water at ambient temperature and then chopped. A vegetable protein and/or complex carbohydrate is added to the resulting mixture, and again chopped. Then the resulting composition is cooled overnight before being chopped or ground into crumbles. By way of example, a use of the crumble is described as a meat extender in pepperoni. The raw materials used here are different from that of the present invention, and an isolate is too costly. Further, the process of preparation is entirely different from the present one.

Reference may be made to European Patent EP19900103415 (1983) wherein a method of processing whole soybeans to produce discrete, irregularly-shaped chunks or pieces of textured proteinaceous material which are free from off-flavors and odors and have a meat-like texture and appearance is described. Whole soybeans are hydrated and acidified to a pH in the range of about 4.5 to 6.5 and the pH of the soybeans is maintained in this range throughout processing. The acidified whole soybeans are ground in an aqueous medium to provide an aqueous slurry or dough of soybean particles having a pH in the range of 4.5-6.5. The aqueous acidic slurry or dough is passed through a confined treatment zone in which high temperature pressurized steam is injected directly into a confined stream of the slurry or dough under conditions which effect texturization of the soy protein in the form of discrete chunks or pieces which are discharged from the treatment zone. The texturized pieces, when discharged from the treatment zone or when dried and rehydrated are free of off-flavors and odors and have a meat-like texture, firmness and appearance. They are suitable for use in a wide variety of food products, including frozen products, canned products and dry mix products. If desired, additives such as flavoring, coloring, fat, seasoning and other proteinaceous materials may be incorporated in the texturized soy protein pieces. The raw material used here is different from that used in the present claim. The drawback of this process lies in using acids for pH adjustment, and need further treatment to get rid of the same.

Reference may be made to a European Patent EP0385266 (1990) where a method of producing simulated meat product from whole soybeans is disclosed. Whole soybeans has been used to produce discrete, irregularly-shaped chunks or pieces of textured proteinaceous material which are free from off-flavors and odors and have a meat-like texture and appearance. Whole soybeans are hydrated and acidified to a pH in the range of about 4.5 to 6.5 and the pH of the soybeans is maintained in this range throughout processing. The acidified whole soybeans are ground in an aqueous medium to provide an aqueous slurry or dough of soybean particles having a pH in the range of 4.5-6.5. The aqueous acidic slurry or dough is passed through a confined treatment zone in which high temperature pressurized steam is injected directly into a confined stream of the slurry or dough under conditions which effect texturization of the soy protein in the form of discrete chunks or pieces which are discharged from the treatment zone. The texturized pieces, when discharged from the treatment zone or when dried and rehydrated are free of off-flavors and odors and have a meat-like texture, firmness and appearance. They are suitable for use in a wide variety of food products, including frozen products, canned products and dry mix products. If desired, additives such as flavoring, coloring, fat, seasoning and other proteinaceous materials may be incorporated in the texturized soy protein pieces. The raw material used here is different from that used in the present claim. The drawback of this process lies in using acids for pH adjustment, and need further treatment to get rid of the same.

The present invention relates to a process for the development of multipurpose ready-to-use high-protein soy granules from texturised vegetable protein.

OBJECTS OF THE PRESENT INVENTION

The main object of the present invention is to develop a soy-based multipurpose food ingredient having high protein content.

Another object of the present invention is to provide a soy-based multipurpose food ingredient in ready-to-use form for convenience to consumers.

Yet another object of the present invention is to provide a food ingredient that does not need any further cooking.

Still another object of the present invention is to develop a soy-based multipurpose food ingredient having high protein content in ready-to-use form using texturised vegetable protein (TVP) as the starting material.

A further object of the present invention is to provide a process for preparing a soy-based multipurpose food ingredient having high protein content in ready-to-use form texturised vegetable protein (TVP).

SUMMARY OF THE INVENTION

Accordingly, the present invention provides a multipurpose ready-to-use, high-protein soy granules from texturised vegetable protein having protein content in the range of 45-52% and moisture content in the range of 3 to 8% and a process for preparing the same said process comprising the steps of partial hydration of the texturized vegetable protein pieces/chunks for a period of 15 min to 2 hour such that the moisture content is between 15-25%, equilibration of partially hydrated soy pieces/chunks for a period between 15 minutes and 4 hours, disintegration of the equilibrated soy chunks/pieces by using a shearing machine to obtain a granule size of 1 to 6 mm, and drying the disintegrated granules at a temperature between 40-80° C. for a period between 15 min to 3 hours by using a tray dryer to obtain the multipurpose ready-to-use, high-protein soy granules.

DETAILED DESCRIPTION OF THE PRESENT INVENTION

The present invention relates to a process for preparing a multipurpose ready-to-use high-protein soy granules from texturised vegetable protein soy granules, said process comprising the steps of:
(a) partially hydrating texturised vegetable protein (TVP) using water in the ration of 15:3 to 25:3;
(b) aging the partially hydrated TVP of step (a) to attain moisture content in the range of 15 to 25%;
(c) disintegrating the aged TVP of step (b) to obtain disintegrated granules, and
(d) drying the disintegrated granules of step (c) at a temperature between 40-80° C. to obtain the multipurpose ready-to-use high-protein soy granules having moisture in the range of 3-8%.

In an embodiment of the present invention wherein in step (a), the TVP is hydrated for a time period in the range of 30 min to 2 hours.

In another embodiment of the present invention wherein in step (b), the partially hydrated TVP is aged for a time period in the range of 15 min to 4 hours for equilibration.

In yet another embodiment of the present invention wherein in step (c), the aged TVP is disintegrated using shearing in a machine such as pulverizer, hammer mill, blender, grinder, chopping machine, slicer, deboning machine or mincer to get an appropriate granule size of 1 to 6 mm.

In still another embodiment of the present invention wherein in step (d), the disintegrated granules are dried at a temperature between 40-80° C. for a time period ranging between 15 min to 3 hours.

In one more embodiment of the present invention wherein in step (d), the disintegrated granules are dried using a tray dryer to have moisture content in the range of 3 to 8%.

In one another embodiment of the present invention, the soy granules thus obtained are optionally sieved to classify them according to size and to remove the fines.

In a further embodiment of the present invention, the soy granules thus obtained are used as a major ingredient in food formulations.

In an embodiment of the present invention, the soy granules thus obtained have protein content in the range of 45-52%.

In another embodiment of the present invention, the soy granules thus obtained have moisture content in the range of 3 to 8%.

In still another embodiment the developed soy granules can be consumed directly as a crispy snack with or without addition of salt, flavouring and seasonings.

In yet another embodiment the soy granules can be coated with sugar powder or solution, and similar sweet tasting ingredients to develop sweet ready-to-eat high protein soy granules.

In one more embodiment the developed soy granules can be used to prepare specialty foods such as high protein drinks, beverages, soups, sauces and porridge.

In one another embodiment soy granules can be used to prepare traditional foods like curry, cutlet, kofta, gravy etc. along with cereals, pulses and vegetables.

In a further embodiment of the present invention, the developed product is a convenience food where no further cooking is required like TVP.

The present invention also provides a multipurpose ready-to-use high-protein soy granule obtained from texturised vegetable protein granules having protein content in the range of 45-52% and moisture content in the range of 3 to 8%.

In an embodiment of the present invention, the soy granules can be consumed directly as a crispy snack with or without addition of salt, flavouring and seasonings.

In another embodiment of the present invention, the soy granules can be coated with sugar powder or solution, and similar sweet tasting ingredients to develop sweet ready-to-eat high protein soy granules.

In yet another embodiment of the present invention, the soy granules can be used to prepare specialty foods such as high protein drinks, beverages, soups, sauces and porridge.

In still another embodiment of the present invention, the soy granules can be used to prepare traditional foods like curry, cutlet, kofta, gravy etc. along with cereals, pulses and vegetables.

In a further embodiment of the present invention, the soy granule is a convenience food requiring no further cooking like TVP.

The present invention relates to a process for the development of multipurpose ready-to-use high-protein soy granules from texturised vegetable protein which comprises partial hydration of the texturized vegetable protein pieces/chunks for a period of 15 min to 2 hour such that the moisture content is between 15-25%, equilibration of partially hydrated soy pieces/chunks for a period between 15 minutes and 4 hours, disintegration of the equilibrated soy chunks/pieces by using a shearing machine to obtain a granule size of 1 to 6 mm, drying the disintegrated granules at a temperature between 40-80° C. for a period between 15 min to 3 hours by using a tray dryer to have the moisture content in the range of 3 to 5%.

Novelty

The developed soy granules are made from texturised vegetable protein.

The developed granules do not require any further cooking like TVP thereby offering maximum convenience for the users.

The process of development involves cost-effective simple processing systems and techniques.

The developed product can be used as a high-protein ingredient with multiple uses including increasing the protein content and replacing meat.

The present invention is described hereafter with reference to the examples which are given by way of illustration and hence, should not be construed to limit the scope of the present invention in any manner.

EXAMPLE 1

Development of Soy Granules from Texturised Vegetable Protein

The texturised vegetable proteins (TVP) were prepared using a single screw cooking extruder with a barrel diameter of 115 mm. This extruder is commercially used to manufacture TVP. Defatted soy flour with moisture and protein content of 7% and 49%, respectively was fed to the extruder through a screw feeder. The required quantity of water was added directly to the extruder while in operation at a screw speed of 400 rpm. The TVP pieces, coming out of the extruder die were subjected to cutting due to the action of rotary knife, were dried in a continuous drier for 45 min at a temperature of 70° C. to attain a product moisture content of 3-5%. Later, the TVP pieces were mixed with water in the ratio of 20:3 and allowed to equilibrate for 2 hours in closed condition. The semi-soft and partially hydrated pieces were sheared in a hammer mill with 8 flexible blades and a sieve with holes each with 4 mm diameter. The semi-wet soy granules thus obtained were dried in a tray drier for 2 hours at a temperature of 60° C. The dried samples were sieved to grade the samples according to size and to remove the fines. The soy granules thus developed has sizes between 1 to 6 mm and a moisture content of 4%, The protein content of the product was about 50% and the colour of the product was light yellowish brown. The developed product can be used in several formulations that have been described in the following sections.

EXAMPLE 2

Preparation of Ready-to-eat Snacks Using Soy Granules

The soy granules prepared using the abovementioned process were used to prepare two types of ready-to-eat snacks. The first product is spicy in taste. It was made using 2 kg of soy granules on to which hot hydrogenated fat (90 gram) was sprayed along with sprinkling of a salt-spice mix containing 40 gram of common salt and 5 gram of chili powder while the mass is in rotation in a coating pan. The developed snack has a protein content of about 43%. On the other hand, sweet snack product was prepared by adding a slurry containing 300 gram sugar and 5 gram of salt to 2 kg of soy granules in a coating pan while using hot air at 70° C. to dry the product to a moisture content below 5%. The protein of the ready-to-eat sweet granules has a protein content of about 27%.

EXAMPLE 3

Preparation of Traditional Product Such as Spicy-soy-kofta to Replace Ground Meat or Mince The developed soy granules were used to prepare spicy-soy-kofta. A kofta is a traditional Indian food with spherical shape used in gravy and is made up of cooked mashed potato or minced meat etc. In the present case, meat was completely replaced by soy granules whereas other ingredients such as puffed Bengal gram (in form of split pulse and powder), salt, ground onion, coconut and spices were used as per ingredients required for making meat kofta. The process of kofta making includes the hydration of soy granules in warm water for about 5-6 minutes followed by squeezing to remove excess water. Later, all the above mentioned ingredients along with hydrated soy granules were ground in wet condition and shaped into spherical balls of diameter varying between 25 to 30 mm. These raw balls were cooked in the boiling gravy made using wet-ground coconut, tomato, salt, onion and spices such as cloves, cinnamon, ginger and garlic in which refined sunflower oil was used for seasoning. The spicy-soy-kofta can be consumed as gravy/curry during breakfast or main meals along with cooked rice and noodles, chapathi or bread.

Advantages of the Present Invention

The developed soy granules have several advantages of which the most important aspect is that it belongs to the ready-to-eat form whereas the starting material (TVP) needs further cooking prior to consumption. The comparison of soy granules and TVP is shown in the Table which clearly indicates the superiority of soy granules over TVP.

TABLE 1

Comparison of TVP and soy granules

| Characteristics | TVP | Soy granules |
| --- | --- | --- |
| Ready-to-eat form | No | Yes |
| Approximate fibre length | >15 mm | <4 mm |
| Approximate fibre thickness | 2-4 mm | 0.1-0.7 mm |
| Nature of fibre | Highly cross-linked, branched | Short strands, branching is rare |
| Texture | Hard | Soft |
| Crispness | Not crisp | Crisp |
| Coating | Not crisp | Useful and suitable |

The invention claimed is:

1. A process for preparing multipurpose ready-to-eat high-protein soy granules from texturized vegetable protein soy granules, said process comprising the steps of:
   (a) partially hydrating the texturized vegetable protein (TVP) by adding water to the TVP in the ratio of 15:3 to 25:3 to attain a moisture content of between 16 to 25%;
   (b) equilibrating the partially hydrated TVP;
   (c) disintegrating the equilibrated partially hydrated TVP to obtain disintegrated granules, and
   (d) drying the disintegrated granules at a temperature between 40-80° C. to obtain multipurpose ready-to-use high-protein soy granules having a moisture content in the range of 3-8%
   wherein the high-protein soy granules have a fiber length of less than 4 mm, and a fiber thickness of from 0.1 to 0.7 mm.

2. The process of claim 1 wherein in step a, the TVP is hydrated and equilibrated for a time period of 30 minutes to 2 hours.

3. The process of claim 1 wherein in step (b), the partially hydrated TVP is equilibrated for a time period of 15 minutes to 1 hour.

4. The process of claim 1 wherein in step (c), the equilibrated TVP is disintegrated by shearing in a machine to obtain an appropriate granule size of 3 to 6 mm.

5. The process of claim 1 wherein in step (d), the disintegrated granules are dried at a temperature between 40-80° C. for a time period of 15 minutes to 3 hours.

6. The process of claim 1 wherein in step (d), the disintegrated granules are dried in a tray dryer.

7. The process of claim 1, further comprising sieving the obtained soy granules to classify them according to size and to remove the fines.

8. The process of claim 1, wherein the obtained soy granules have protein content in the range of 45-52%.

9. The process of claim 1, wherein the obtained soy granules have moisture content in the range of 3 to 8%.

10. The process of claim 1, wherein the obtained soy granules can be consumed directly as a crispy snack with or without addition of salt, flavouring and seasonings.

11. The process of claim 1, further comprising coating the obtained soy granules with sugar powder, or a sugar solution, or similar sweet tasting ingredients to prepare sweet ready-to-eat high protein soy granules.

12. The process of claim 1, further comprising incorporating the obtained soy granules into specialty foods.

13. The process of claim 1, further comprising incorporating the obtained soy granules into traditional foods.

14. The process of claim 1, further comprising incorporating the obtained soy granules into a convenience food that does not require cooking.

15. A process for preparing multipurpose ready-to-eat, high-protein soy granules from texturized soy protein, said process comprising the steps of partially hydrating texturized soy protein pieces/chunks for a period of 15 minutes to 2 hours to obtain a moisture content of between 15-25%, equilibrating the partially hydrated soy pieces/chunks for a period between 15 minutes and 1 hour, disintegrating the equilibrated partially hydrated soy chunks/pieces in a shearing machine to obtain a granule size of 3 to 6 mm, and drying the disintegrated granules at a temperature between 40-80° C. for a period between 15 minutes to 3 hours in a tray dryer to obtain multipurpose ready-to-use, high-protein soy granules having a moisture content in the range of 3 to 5% wherein the high-protein soy granules have a fiber length of less than 4 mm, and a fiber thickness of from 0.1 to 0.7 mm.

16. The process of claim 4 wherein the machine is selected from the group consisting of a pulverizer, hammermill, blender, grinder, chopping machine, slicer, dehorning machine and mincer.

17. The process of claim 1 further comprising incorporating the obtained soy granules into food formulations as a major ingredient.

18. The process of claim 12 wherein the specialty foods are selected from the group consisting of snacks, high protein drinks, beverages, soups, sauces and porridge.

19. The process of claim 13 wherein the traditional foods are selected from the group consisting of curries, cutlet, kofta, gravies, cereals, pulses and vegetables.

* * * * *